United States Patent Office 3,701,671
Patented Oct. 31, 1972

3,701,671
MASONRY MATERIALS AND METHOD OF MAKING THE SAME
Helmer L. Blengsli, Old Greenwich, Conn., assignor to Tekology Corporation, Palisades Park, N.J.
No Drawing. Filed July 1, 1970, Ser. No. 51,675
Int. Cl. C04b 31/14
U.S. Cl. 106—98                5 Claims

ABSTRACT OF THE DISCLOSURE

A unique mineral found in the subsoil of the Bahama Islands was found to yield high quality masonry products in form of bricks, blocks and tiles when crushed to particle sizes ranging from 8 mesh to dust and reacted with a hydraulic cement and water and molded under pressure of at least 500 p.s.i.

To reduce moisture absorption tendency of the masonry products made from the Bahama minerals, these may in part be substituted with silicon sand or Bahamian dredged sea sand. To increase the green strength of the products, the water of hydration may contain upward of 5 percent of a mineral chloride.

BACKGROUND OF THE INVENTION

Field of the invention

The present invention pertains to the field of building materials such as bricks, blocks and tiles made from a unique mineral found in the soil of the Bahama Islands as well as in some of the neighboring Caribbean islands and a process for making said building materials.

SUMMARY OF THE INVENTION

It has been found during the course of experimentation with Bahama subsoil minerals to convert the same to masonry products in form of bricks, blocks and tiles by reacting the same with a hydraulic cement and water, that said mineral when comminuted to proper particle sizes for the purpose assumed such high voluminosity that the mixture of the same with cement and water was unfit for molding under conventional molding procedures in which compaction in the mold is attained by vibration. To solve this problem, it was found necessary to mold under high pressure of at least 500 p.s.i., and for the highest quality of products, a molding pressure of up to 6,000 p.s.i.

While the high pressure molding technique produced strong and attractive bricks and blocks, it was subsequently found that the Bahama aggregates yielded products of high water absorption tendencies. Research revealed that the Bahama mineral was extraordinarily porous and that this porosity was at least in part responsible for the high water absorption property of the masonry products that were made therefrom. In order to counteract this water absorption tendency, part of the Bahama aggregate was replaced with non-porous minerals such as silica sand or sea sand (Bahamian dredged sea sand) with the results that the moisture absorption was reduced substantially in proportion to the non-porous minerals added.

The present invention relates to building materials such as bricks, blocks and tiles made from a unique mineral found in the subsoil of the Bahama Islands and some of the neighboring Caribbean Islands and a process by which said building materials may be made.

Conventionally, building bricks, blocks and tiles were made from (a) clay by forming and heating to sintering; (b) sand and lime by forming and high temperature autoclaving; and (c) sand and portland cement by forming and high temperature autoclaving.

It is to be noted that none of the above-cited processes may be applied to the mineral which is basic to the present invention, and which henceforth will be designated as the Bahama aggregate, or merely the aggregate, although the same may be found on other Caribbean Islands.

The method or process by which the Caribbean aggregates may be converted to useful masonry products is commercially significant for three main reasons:

(1) The aggregates are the only minerals that are available for conversion to masonry products in the area;
(2) The aggregates by virtue of their calcareous nature cannot be used for masonry production in processes which require heat curing;
(3) Because the process of the present invention does not require heat curing, the cost of heat curing is avoided and more significantly the cost of heat curing equipment is also avoided—thus reducing the capital investment to approximately one-half of the investment cost in conventional processes.

The Bahama aggregate

The aggregate is mined in the Bahama Islands by stripping off the overburden of topsoil and so as to lay bare a porous calcareous mineral of predominantly calcite, associated with a silt deposit which in local terminology is called "clay." Mined, crushed, screened and finally washed with water to remove attached topsoil, several fractions are obtained: Top soil, "sludge," "sand," and "plant tailings."

The topsoil had no application in the process. The sludge, which is the result of the washing operation, contains a substantial amount of topsoil, upward of 30 percent of clay, and whereas the bulk of the solids in the sludge is calcite, and it produces a strong brick and block, the products made therefrom are not recommended for atmospheric exposure.

The sand is predominantly comminuted calcite and may contain as much as 10 percent of clay, but is substantially free of topsoil, the plant tailings may contain as much as 15 percent of clay and traces of topsoil. Separate or in combination the sand and the plant tailings constitute the Bahama aggregate, or simply the aggregate, of the present invention.

Chemically, the calcareous mineral is substantially pure calcium carbonate. Physically, it is of calcite crystalline structure and appears in a porous form akin to pumice but is more friable. Due to its porosity, it may absorb as much as 16 percent of water and still feel dry to the touch. It is suspected that the porosity is, at least in part, responsible for its unique property as aggregate in the process.

The clay, which is part of the aggregate to the extent of about 2 to 15 percent is not a clay in a mineralogical sense since it contains probably not more than 20 percent of aluminum silicate and this chiefly in form of a chlorite crystalline structure, the remainder being calcite and a minor content of marine-originated minerals of some cation-exchange capacity. In view of this the name clay does not strictly apply, but since this designation has acquired commercial acceptance, it will be used in the disclosure and claims as referring to the silt deposit associated with the subsoil of the Caribbean Islands and in particular in the subsoil of the Bahama Islands.

Having now defined the chemical and physical properties of the aggregate of the invention it will be obvious that this material cannot be used as aggregate in brick and block manufacturing processes which require heat curing. The only conventional brick and block process in which the Bahama aggregate might conceivably be used is the concrete process. However, as will be explained, even this is not possible. There are two main reasons for this:

First, the Bahama mineral, when properly comminuted to serve as aggregate for masonry products, assumes a peculiarly high voluminosity that when mixed with cement and water the mix is incapable of compacting under conventional vibration molding procedure of the concrete brick and block industry.

Secondly, due to the high porosity of the aggregate it will, when comminuted to proper particle size, absorb as much as 20 percent of water and still feel dry to the touch. In conventional brick and block manufacturing processes in which practically no pressure is used in molding, this absorbed water would be unavailable for hydration of the cement, and additional water would be required for this purpose. The net result would be that the wet mix would be substantially over-gauged.

In order to overcome these problems, a method of molding under high pressure has been devised and found satisfactory in all respects for conversion of the Bahama aggregate to first-rate masonry materials.

The primary advantage of the high pressure molding technique is the fact that it permits operation with a highly comminuted aggregate, which for the Bahama-type aggregate is of utmost importance for production of a uniformly dense body and high mechanical strength of the products. Secondly, the high pressure molding technique reverses the capillary absorption of water in the porous aggregate and renders a sufficient quantity of this available for hydration of the cement, thus preventing the need of over-gauging the wet mix and thereby jeopardizing the compressive strength of the product. Thirdly, the combination of highly comminuted aggregate and high molding pressure results in products of clean and sharp edges and close dimensional tolerances.

Finally, a very important benefit of the high molding pressure is the fact that the high pressure forces the particles of the aggregate close together and thereby forces the cement paste to fill the reduced cavities between the particles. This is of utmost importance for a successful and economic utilization of such a highly porous aggregate in production of masonry materials of high compressive strength.

Further, if a high molding pressure were not used for the Bahama aggregate, an unacceptably high percentage of cement paste would be required to fill the cavities, and even so adequate strength would not be attained since this is not only a function of the percentage of cement in the product but also a function of the closeness, and thereby the rigidity of the aggregate particles in the cement matrix.

To recapitulate the advantages of high pressure molding technique as far as the Bahama aggregates are concerned:

(1) It allows operating with a highly comminuted aggregate which is necessary for production of a dense and strong product;
(2) It allows operating with acceptable water-cement ratios since water absorbed in the capillaries is at least in part forced to the surface and is made available for hydration of the cement;
(3) It yields products of dense surfaces, sharp edges and close dimensional tolerances;
(4) It reduces the requirement of cement.

The process

The process comprises the following steps:

(1) Reducing the aggregate to a gradual particle size distribution;
(2) Mixing the comminuted aggregate with a hydraulic cement and water;
(3) Molding the mix under pressure;
(4) Curing the green product prior to shipment.

Step 1 is of particular importance in the process of making quality masonry materials from the Bahama aggregate. Since the material is porous and friable, it would, if used in coarse particles, break down to some extent under the molding pressure and expose breakdown surfaces unreacted with the cement paste. This would produce dead spots in the body of the product, and unsightly blemishes on the surfaces of the same. To avoid this, the process of the invention calls for milling or grinding of the aggregate to particle sizes which can withstand the molding pressure, and to a gradation of particle sizes which will insure uniform packing in the molding operation. Table I shows sieve analyses of comminuted aggregate particle size distribution from the barely acceptable in coarseness (column A) to the barely acceptable in fineness (column E). The generally preferred particle size distribution is illustrated by the sieve analyses as given in columns C and D.

TABLE I.—SIEVE ANALYSES OF COMMINUTED BAHAMA AGGREGATES

| U.S. Sieve No. | Percent on sieves | | | | |
|---|---|---|---|---|---|
| | A | B | C | D | E |
| 4-8 | 22 | 10 | 5 | | |
| 16 | 20 | 15 | 15 | 2 | 2 |
| 30 | 20 | 20 | 20 | 18 | 8 |
| 50 | 20 | 20 | 25 | 30 | 20 |
| 100 | 10 | 20 | 15 | 20 | 25 |
| Pan | 2 | 10 | 20 | 30 | 45 |
| Total | 100 | 100 | 100 | 100 | 100 |

Step 2 is important since adequate mixing of the reacting components of the mix is a prerequisite for production of a homogeneous product of consistent mechanical strength. The mixing is preferably conducted in two steps: first dry mixing of aggregate and cement, followed by gradual addition of water and wet mixing. With modern efficient mixing the total mixing time may be as low as 2–3 minutes; however, 4–5 minutes total mixing time is preferred.

It is to be further noted that the choice of type and amount of cement used depends largely on the quality of the products desired. Any hydraulic cement may be used, including pozzolana, or pozzolana in conjunction with lime. Portland cement, alone or in admixture with lime, has proven advantageous since the aggregate appears to have some pozzolana effect. Type III or rapid setting portland cement, or the newer types of rapid setting cements may be preferred, particularly for delicate shaped masonry products.

The amount of cement used ranges from 3 percent to 15 percent of the weight of the dry mix, i.e., aggregate and cement. The former is adequate for "common" brick quality, the latter is used only for the highest grades of facing bricks. For ordinary grade facing brick of A.S.T.M. compressive strength specification, 6 to 10 percent cement is generally adequate.

The amount of water used is important for the quality cementous products. This is a well-known rule in concrete formulations where an average w/c (water/cement) ratio of 0.6 may be maintained. It has been found that w/c rules governing the concrete formulation do not apply to the Bahama aggregate. Due to the porous condition of this mineral substantially more water is required since some of the gauging water will be trapped inside the aggregate particles. If this condition is not taken into account, a friable and useless product will be obtained.

Since for the Bahama aggregate-cement mix there are two independent demands on the water, the amount of water required cannot be specified by a w/c ratio alone, but must be determined experimentally for the type and grind of aggregate used. The water demand ranges generally between 7 and 15 percent of the dry mix, i.e., aggregate plus cement. For aggregates of low cation-exchange properties, it has been found advantageous to use a small amount of a metallic chloride in the gauging water, for instance, in the amount of 2 to 5 percent. Metallic chlorides chosen from the group consisting of $CaCl_2$, $MgCl_2$, $AlCl_3$, and $HCl$, or a combination of these have proven beneficial in promoting early and increased strength of the products.

Step 3 is preferably accomplished by means of an automatic machine of high compression capacity. Such machines are available which will fill the molds with a predetermined quantity of mix, compress to a predetermined molding pressure, and eject the green product in a matter of seconds. Whereas the automatic feature is not a requirement, it is required that the molding equipment is capable of yielding a molding pressure of at least 500 p.s.i. on the product. For the highest grade of masonry products, it is desirable to mold under pressures of up to 6,000 p.s.i.

A typical relationship between the molding pressure and the compressive strength of the product is illustrated by data in Table II. For most Bahama aggregates 500 p.s.i. is a critical minimum; below this the compressive strength of the product falls off disproportionally with the molding pressure and has no commercial application.

TABLE II

Compression strength vs. molding pressure for standard bricks made from Bahama aggregate using 10% portland cement and 15% water

| Molding pressure, p.s.i.: | Compression strength, p.s.i. |
|---|---|
| 500 | 1,000 |
| 1,000 | 2,100 |
| 1,500 | 2,800 |
| 2,000 | 3,400 |
| 3,000 | 4,000 |
| 4,000 | 4,400 |
| 5,000 | 4,700 |
| 6,000 | 4,800 |

Step 4 relates to the handling of the green product after it is ejected from the mold. Whereas the green product is generally sufficiently strong to be stacked or cubed, it required about 24 hours curing prior to shipment. Preferably the green product is allowed at least 7 to 21 days for moisture equlibrium adjustment before it is used for loadbearing purposes. Unless this step is accelerated at a moderately higher than atmospheric temperature, as is normal for cementitious products, the compressive strength will increase after 21 days of normal temperature curing, but at an increasingly low rate.

Whereas the Bahama aggregate performs excellently to the end of producing a strong and attractive building material in form of bricks and blocks, the products have a tendency to high moisture absorption (15 to 18 percent) as measured by the 24 hours soak test. To remedy this, when desired, it has been found essential to substitute part of the Bahama aggregate with a non-porous mineral, such as crushed rock, silica sand and the like. In the Caribbean Islands such minerals are not readily available, but it has been found that a marine-based mineral called "sea sand" in the local terminology is abundantly available and will serve as a moisture absorption reducer. Chemically, the sea sand is a calcium carbonate; geologically, it may be classified as an aragonite. It appears on the ocean bottom in a particle size distribution ready for use as partial substitute for Bahama aggregate up to 50 percent without the need of crushing. Such substitution may reduce moisture absorption in the finished products by 50 percent or well below the generally accepted limit of 10 percent.

Since any comminuted, substantially non-porous mineral may be used for the purpose hereinabove described for sea sand, such agents may be classified as water absorption reducing agents, and as such function as a part of this invention.

The product

It is to be noted that the product of the present invention is a masonry material in form of bricks, blocks, and tiles, composed of 85 to 97 parts of a porous, calcareous mineral, native to the Caribbean Islands, particularly so to the Bahama Islands, containing from 2 to 20 percent of clay, 3 to 15 parts of a hydraulic cement and sufficient water of hydration of said cement, compacted under at least 500 p.s.i.

Physically, the masonry materials are characterized by an extraordinary high compressive strength, equal to or substantially in excess of the A.S.T.M. specification for said masonry materials made according to conventional processes. The products of the invention are also characterized by an extraordinary high green strength of 290 to 580 p.s.i. which allows cubing immediately on removal from the molds.

The high green strength is a property traceable to the clay content of which 15 to 20 percent apparently classify as a chlorite or true aluminum silicate. The remainder may best be defined as a conglomerate of various crystalline forms of calcium carbonate and a small percentage of marine salts of a minor cation-exchange capacity.

As previously noted, products made from all Bahama aggregate are likely to have high moisture absorption properties. In order to reduce the moisture absorption to acceptable dimensions, non-porous, granular minerals may be substituted in part for the porous Bahama aggregate. In such a case the moisture absorption reducing agent will be a part of the product and will reduce the Bahama aggregate by the amount of its presence.

Table III illustrates the quality of bricks and blocks produced by the process of the invention at a modest use of 5 to 10 percent of portland cement.

The Sand and Plant Tailings used in these products was made by the New Providence Development Company Limited, Bahamas, according to the process outlined under the heading "The Bahama Aggregate," and is merchandized under the name of "New Providence Development Company Manufactured Sand" and "New Providence Development Company Aggregate Plant Tailings" respectively. The Sea Sand used is merchandized as "Bahamian Dredged Sea Sand."

TABLE III

Compressive strength of bricks and blocks made from Bahama aggregate compared with A.S.T.M. standards for concrete building bricks and blocks

| | Compressive strength, p.s.i. |
|---|---|
| Bricks made from Bahama aggregates: | |
| (A) Sand, 10 percent cement | 5,550 |
| (B) Plant tailings, 10 percent cement | 4,450 |
| (C) Plant tailings, 5 percent cement | 3,880 |
| (D) Sand+50 percent sea sand, 10 percent cement | 4,400 |
| Blocks made from Bahama aggregates: | |
| (E) Sand+50 percent sea sand, 10 percent cement | [1] 2,800 |
| (F) Plant tailings, 10 percent cement | [1] 2,400 |
| A.S.T.M. specification for facing bricks— | |
| Grade U–I, U–II | 3,500 |
| Grade P–I, P–II | 2,500 |
| Hollow load-bearing blocks— | |
| Grade U–I, U–II | [1] 2,000 |
| Grade P–I, P–II | 1,000 |

[1] Net.
[2] Gross.

I claim:
1. Method of producing a masonry product in the form of brick, block or tile which comprises (a) mixing 85–97 parts by weight of mineral material at least 50% of which is Bahama aggregate having a particle size not exceeding U.S. standard mesh 4 and the remainder of which is non-porous material with 3 to 15 parts by weight of hydraulic cement, up to 5 parts by weight of at least one chloride from the group consisting of HCl, $CaCl_2$, $MgCl_2$ and $AlCl_3$ and 5–15 parts by weight of water per 100 parts by weight of said mineral material; (b) molding the thus obtained material under pressure of at least 500 p.s.i.; and (c) curing the thus obtained molded product under ambient conditions.

2. Method according to claim 1 wherein said non-porous material is at least one material selected from the group of crushed rock, silica sand and Bahama sea sand.

3. Method according to claim 2 wherein said mixture contains at least 2% of said chloride.

4. Method according to claim 2 wherein said molding is carried out under pressure of between 500 p.s.i. and 6,000 p.s.i.

5. Method according to claim 2, wherein said molding is carried out under pressure of about 5,000 p.s.i.

References Cited

UNITED STATES PATENTS

| | | | |
|---|---|---|---|
| 3,366,720 | 1/1968 | Burger | 106—97 |
| 2,302,988 | 11/1942 | Witty | 106—97 |

OTHER REFERENCES

Lea and Desch: "The Chemistry of Cement and Concrete," Edw. Arnold & Sons, pp. 483–485 (1956).

Lea and Desch: "The Chemistry of Cement and Concrete," Edw. Arnold & Sons, pp. 342, 343 (1956).

Taylor, W. H.: "Concrete Technology and Practice," American Elsevier, p. 168 (1965).

JAMES E. POER, Primary Examiner

W. T. SCOTT, Assistant Examiner

U.S. Cl. X.R.

106—89